United States Patent [19]

Bopp et al.

[11] Patent Number: 5,095,041
[45] Date of Patent: Mar. 10, 1992

[54] SIMPLE PROCESS FOR IMBIBING BLOWING AGENTS IN THERMOPLASTIC RESIN GRANULES

[75] Inventors: Richard C. Bopp, West Coxsackie; William J. Ward, III, Schenectady, both of N.Y.

[73] Assignee: General Electric Company, Selkirk, N.Y.

[21] Appl. No.: 457,365

[22] Filed: Dec. 27, 1989

[51] Int. Cl.$^5$ .............................. C08J 9/18; C08L 35/06
[52] U.S. Cl. ........................................ 521/60; 521/56; 521/139
[58] Field of Search .............................. 521/60, 56, 139

[56] References Cited

U.S. PATENT DOCUMENTS

| | | | |
|---|---|---|---|
| 3,250,834 | 5/1966 | Collins | 264/53 |
| 4,303,756 | 12/1981 | Kajimura et al. | 521/59 |
| 4,385,016 | 5/1983 | Gwinn | 264/37 |
| 4,386,165 | 5/1983 | Suh | 521/79 |
| 4,442,232 | 4/1984 | Kajimura et al. | 521/56 |
| 4,459,373 | 7/1984 | Hahn et al. | 521/56 |
| 4,532,263 | 7/1985 | Krutchen et al. | 521/133 |
| 4,606,873 | 8/1986 | Biglione et al. | 264/53 |
| 4,647,593 | 3/1987 | Joyce et al. | 521/60 |
| 4,661,386 | 4/1987 | DiGiulio | 428/35 |
| 4,782,098 | 11/1988 | Allen et al. | 521/81 |
| 4,920,153 | 4/1990 | Allen et al. | 521/60 |
| 4,992,482 | 2/1991 | Bartosiak et al. | 521/60 |

FOREIGN PATENT DOCUMENTS 3220856 12/1982 Fed. Rep. of Germany .
1062307 3/1967 United Kingdom .

OTHER PUBLICATIONS

Frisch and Saunders, ed., "Plastic Foams", Marcel Delker, Inc., N.Y., Part II, pp. 525–625, 1973.

Primary Examiner—John Kight, III
Assistant Examiner—John M. Cooney, Jr.
Attorney, Agent, or Firm—Hedman, Gibson & Costigan

[57] ABSTRACT

A simple process for producing expandable thermoplastic resin particles is provided wherein a desired amount of a blowing agent is added to a particulate thermoplastic resin in a closed vessel and the mixture is allowed to age at ambient conditions for a sufficient period of time to allow the resin to become impregnated with the blowing agent.

24 Claims, No Drawings

SIMPLE PROCESS FOR IMBIBING BLOWING AGENTS IN THERMOPLASTIC RESIN GRANULES

The present invention relates to a process for producing expandable thermoplastic resin particles. More particularly, it relates to a process for producing expandable thermoplastic resin particles comprising mixing the thermoplastic resin with the blowing agent in a closed vessel for a time period sufficient to impregnate the thermoplastic resin particles with the blowing agent.

BACKGROUND OF THE INVENTION

It is known in the art to produce thermoplastic resin particles imbibed with a blowing agent for expansion at a later time. In the case of polystyrene foam products, generally a blowing agent such as pentane is impregnated under elevated pressure and temperature in polystyrene. The impregnated particles are then heated, usually in steam or air and the particles foam. The foamed particles can then be placed in a mold and heated again to the point where the particles fuse. The result is a quite rigid low density product which has many uses from packaging the insulating board.

There are many disclosures in the art for imbibing polystyrene particles. Early processes are summarized in Frisch & Saunders, "Plastic Foams", Marcel Delker, Inc., N.Y., 1973, Part II, pp. 525–544, such as diffusion of blowing agents into polystyrene, polymerization of styrene solutions of volatile hydrocarbons, suspension polymerization systems, deposition of expandable polystyrene from solution, quenched-pellet processes and water-in-monomer polymerizations.

There have been a variety of attempts to produce expandable pellets by incorporating the blowing agent in a polymer melt in an extruder and cutting the extrudate into pellets. Collins, in U.S. Pat. No. 3,250,834 extrudes strands of polystyrene containing pentane into grooves onto rotating rolls maintained at a temperature below the expanding temperature of the extruded material. Other disclosures employ underwater pelletizers, see e.g. Biglione et al, U.S. Pat. No. 4,606,873; Gwinn, U.S. Pat. No. 4,385,016; Muirhead et al, United Kingdom Patent No. 1,062,307; Suh, U.S. Pat. No. 4,386,165; and Allen et al in commonly assigned U. S. Pat. application, Ser. No. 093,317, filed Sep. 4, 1981. Hambrecht et al in German Patent DE 3,220,856 discloses melting a polyphenylene ether/polystyrene blend and mixing with a blowing agent at a pressure of 25 to 250 bars, but does not describe making expandable pellets.

It is also known to incorporate a blowing agent into the thermoplastic resin during polymerization. Kajimura et al, U.S. Pat. No. 4,442,232 teaches the addition in the blowing agent to the reaction system in the production of expandable styrene-maleic anhydride copolymers. See also Hann et al, U.S. Pat. No. 4,459,373.

At present the most common method is to impregnate the thermoplastic particles with blowing agent in a suspension. Kajimura et al, U.S. Pat. No. 4,303,756 describes impregnating thermoplastic resin beads with blowing agent in an aqueous suspension under pressure and at temperatures of about 80° C. Krutchen et al, in U.S. Pat. No. 4,532,263 discloses imbibing polyetherimide resins in an excess of a solvent selected from the group consisting of methylene chloride, chloroform and 1,1,2-trichloroethane at temperatures up to about 100° F. DiGiulio, U. S. Pat. No. 4,661,386 discloses carrying out the impregnation of pentane in polystyrene in a slurry of water at 90° C. stabilized by finely divided calcium phosphate and an anionic surfactant. Allen et al, in commonly assigned U.S. Pat. No. 4,782,098 discloses suspending the thermoplastic resin beads in water containing a suspending agent in an autoclave, heating the suspension and introducing the blowing agent under pressure to produce the expandable thermoplastic beads.

These emulsion imbibing processes are highly capital and labor intensive because they are conducted at high pressures and elevated temperatures. It would be a notable advance in the state of the art to discover a much simpler but equally effective imbibing process. Surprisingly, it has now been found that by adding the desired amount of blowing agent to the thermoplastic resin beads, agitating and then storing the mixture in a closed container at ambient conditions for a sufficient amount of time there is produced expandable thermoplastic beads. One can imagine a continuous process in which the blowing agent and thermoplastic resin beads are mixed in a container, such as a polyethylene lined bag, and after sitting for a period of time, opening the bag and having expandable beads ready for use.

SUMMARY OF THE INVENTION

According to the present invention, there is provided a process for providing expandable thermoplastic resin particles comprising (a) adding the thermoplastic resin in particulate form to a vessel; (b) adding a desired amount of liquid blowing agent; (c) agitating the mixture until the blowing agent and the resin particles are thoroughly mixed; and (d; closing the vessel and allowing said mixture to age at ambient conditions for a period of time sufficient to impregnate the particles with the blowing agent. Preferred thermoplastic resins are polyphenylene ether, principally atactic polystyrene, polyphenylene ether/polystyrene blend, poly(alpha-methylstyrene), poly(nuclear-methylstyrene), poly(-para-methylstyrene), polybromostyrene, polydibromostyrene, polychlorostyrene, polydichlorostyrene, styrene-maleic anhydride copolymer or a mixture of any of the foregoing. The preferred blowing agent is butane, n-pentane, isopentane, cyclopentane, neopentane or mixtures thereof.

DETAILED DESCRIPTION OF THE INVENTION

The invention may be practiced with the use of a wide variety of thermoplastic resins encompassed within the broader description given above. In the typical case however, use is made of certain preferred materials which are described below.

The polyphenylene ether resin is normally a homo- or copolymer having units of the formula

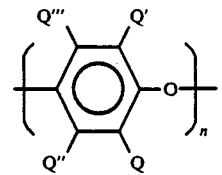

wherein Q, Q', Q , Q''' are independently selected from the group consisting of hydrogen, halogen, hydrocarbon, halohydrocarbon, hydrocarbonoxy and halohydrocarbonoxy; and n represents the total number of monomer units and is an integer of at least about 20, and more usually at least 50.

The polyphenylene ether resin can be prepared in accordance with known procedures, such as those described in Hay, U.S. Pat. Nos. 3,306,874 and 3,306,875; and Stamatoff, U.S. Patent Nos. 3,257,357 and 3,257,358; from the reaction of phenols including but not limited to 2,6-dimethylphenol; 2,6-diethylphenol; 2,6-dibutylphenol; 2,6-dilaurylphenol; 2,6-dipropylphenol; 2,6-diphenylphenol; 2-methyl-6-tolylphenol; 2-methyl-6-methoxyphenol; 2,3,6-trimethylphenol; 2,3,5,6-tetramethylphenol; and 2,6-diethyoxyphenol.

Each of these may be reacted alone to produce the corresponding homopolymer, or in pairs or with still other phenols to produce the corresponding copolymer. Examples of the homopolymer include poly(2,6-dimethyl-1, 4-phenylene)ether, poly(2,6-diethyl-1,4-phenylene)ether, poly(2,6-dibutyl-1,4-phenylene)ether, poly(2,6-dilauryl-1, 4-phenylene)ether, poly(2,6-dipropyl-1,4-phenylene)ether, poly(2,6-diphenyl-1,4-phenylene)ether, poly(2-methyl-6-methoxy-1,4-phenylene)ether, poly(2-methyl-6-butyl-1,4-phenylene)ether, poly(2,6-dimethoxy-1,4-phenylene)ether, poly(2,3,6-trimethyl-1,4-phenylene)ether, poly(2,3,5,6-tetramethyl-1,4-phenylene)ether, and poly(2,6-diethyoxy-1,4-phenylene)ether. Examples of the copolymer include, especially those of 2,6-dimethylphenol with other phenols, poly(2,6-dimethyl-co-2,3,6-trimethyl-1,4-phenylene)ether and poly(2,6-methyl-co-2-methyl-6-butyl-1,4-phenylene)ether.

For the purposes of the present invention, an especially preferred family of polyphenylene ethers include those having alkyl substitution in the two positions ortho to the oxygen ether atom, i.e. those of the above formula wherein Q and Q' are alkyl, most preferably having 1 to 4 carbon atoms. Illustrative members of this class are: poly(2,6-dimethyl-1,4-pnenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)etner; poly(2-ethyl-6-propyl-1,4-phenylene) ether; and the like.

The most preferred polyphenylene ether resin for purposes of the present invention is poly(2,6-dimethyl-1,4-phenylene)ether.

The term "alkenyl aromatic polymer" as it is employed in this disclosure is intended to encompass homopolymers of styrene as well as rubber-modified high impact varieties, and also copolymers and terpolymers of alkenyl aromatic compound with one or more other materials. Preferably, the alkenyl aromatic polymer is based at least in part on units of the formula

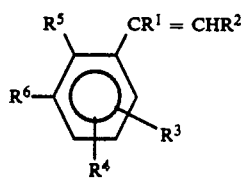

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms; or $R^5$ and $R^6$ may be concatenated together with hydrocarbyl groups to form a naphthyl group.

The above will encompass styrene, as well as homologs and analogs of styrene. Specific examples include, in addition to styrene, chlorostyrene, bromostyrene, alpha-methylstyrene, para-methylstyrene, nuclear-methylstyrene, para-tert-butylstyrene, dichlorostyrene, vinyl styrene, divinyl benzene and vinyl naphthalene. Styrene is especially preferred.

By way of illustration, the polystyrene component can be a homopolystyrene, principally atactic, or other alkenyl aromatic nomopolymer which has been modified by admixture or interreaction with a natural or synthetic rubber, for example, polybutadiene, polyisoprene, EPDM rubber or silicone rubber; or it can be a copolymer or terpolymer of styrene or other alkenyl aromatic compound with an elastomeric or other material, such as block copolymers of styrene and butadiene (for example, AB, ABA, ABAB or ABABA type), including hydrogenated forms of the foregoing; a radial teleblock copolymer of styrene, butadiene and a coupling agent, including hydrogenated forms; terpolymers of acrylonitrile, styrene and butadiene (ABS); styrene-acrylonitrile copolymers (SAN); and a copolymer of styrene and maleic anhydride (SMA); or it can also be an alkenyl aromatic copolymer to terpolymer which has been modified with rubber, for example rubber-modified styrene-maleic anhydride copolymer. Many of these are described in the patent literature, including Cizek, U.S. Pat. No. 3,383,435.

The polyphenylene ether (PPE) and polystyrene (PS) resins may be combined in any conventional manner. Polyphenylene etner resin will typically be in powder or pellet form and the polystyrene will typically be in pellet form. The resins may be combined by dry blending in a blender which provides a relatively uniform mixture of the resins. This mixture is typically directed to a thermoplastic extruder, usually of the single or twin screw type, where in the case of a blend the resin is compounded with sufficient temperature and shear to provide an intimate PPE/PS blend.

The product of the conventional extruder is an extrudate in the form of strands which may be quenched with cooling water. The cooled strands are then conveniently directed to a pelletizer device which provides the PPE/PS resin in particulate form for use in the present invention. Preferably the pelletizing device provides granules consisting of cylindrical or substantially spherical particles of up to about 2.0 mm in diameter, preferably up to about 1.0 mm and more preferably up to about 0.5 mm.

The polyphenylene ether and polystyrene resins are combinable in all proportions, e.g. from about 1 to about 99 parts by weight polyphenylene ether and from about 99 to about 1 part by weight polystyrene. It is contemplated however, that low density compositions of the present invention are comprised of at least 2 weight percent PPE based upon the weight of PPE and PS taken together. Compositions containing less than 2 weight percent PPE are considered to be primarily polystyrene compositions and do not generally exhibit the preferred property improvements associated with PPE/PS blends. It is well known that the addition of PPE to PS resin offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention will be comprised of between from about 5 to about 95 percent and preferably from about 20 to about 80 percent by weight PPE and from about 95 to about 5 percent and preferably from about 80 to about 20 percent by weight PS based upon the weight or the two resins taken together.

During the blending step, it is contemplated that conventional additives may be incorporated into the resin mixture if desired. These include rubbery impact modifiers, flame retarding agents, stabilizers for thermal and color stability, antioxidants, processing aids, plasticizers, anti-static agents, reinforcing and extending fillers, pigments, mixtures of any of the foregoing and the like. Each of these may be utilized to a greater or lesser degree depending on the required final properties desired in the final product. Conventional surfactants and nucleants used in expanded polystyrene foams may also be utilized. Examples of these include zinc or tin stearates, maleates, fumarates and the like.

The blowing agents which may be utilized in the practice of this invention are generally volatile liquids but may also comprise gaseous blowing agents. The blowing agents may comprise straight-chain, cyclic or halogen-substituted hydrocarbons. The preferred hydrocarbon blowing agents will include aliphatic hydrocarbons. Examples include propane, isopropane, butane, isobutane, n-pentane, isopentane, neopentane, cyclopentane, pentene, hexane, heptane, octane and mixtures of any of the foregoing. Fluorocarbon blowing agents include trichlorofluoromethane ($CCl_3F$), dichlorodifluoromethane ($CCl_2F_2$), chlorodifluoromethane (HCFC-22) ($CHClF_2$), $CClF_2$-$CClF_2$ and mixtures of any of the foregoing. These are commercially available as Freon® 11, Freon® 12, FORMACEL®S and Freon® 114. Other halogenated hydrocarbon blowing agents include methylene chloride, chloroform, carbon tetrachloride and the like. Other blowing agents contemplated for use in the present invention are acetone, ethyl acetate, methyl ethyl ketone, alcohols having from 1 to 5 carbon atoms, halogenated alcohols such as fluoroisopropanol, and water. Also contemplated as useful blowing agents are the HCFC's, e.g., dichlorotrifluoroethane (HCFC-123) ($CHCl_2CF_3$), dichlorotrifluoroethane (HCFC-123A) ($CHFClCCl_2$), chlorotetrafluoroethane (HCFC-124) ($CHClFCF_3$), tetrafluoroethane (HFC-134A) ($CH_2FCF_3$), dichlorofluoroethane (HCFC-141B) ($CCl_2FCH_3$), chlorodifluoroethane (HCFC-142B) ($CH_3CClF_2$), difluoroethane (HFC-152A) ($CH_2CHF_2$), mixtures thereof and the like.

The blowing agent should be added in an amount of from about 2 to about 20 weight percent, more preferably from about 5 to about 15 weight percent, and most preferably from about 6 to about 8 weight percent, based on the weight of the thermoplastic resin composition. The blowing agent only must not plasticize the outside surface of the particles to the extent that the glass transition temperature to the polymer forming the particle falls below room temperature causing agglomeration. Further, certain combinations of polymer and blowing agent will not work well, e.g. polystyrene with n-pentane.

Once the thermoplastic resin particles and desired amount of blowing agents are placed in a vessel, the mixture is agitated until the blowing agent and thermoplastic resin particles are thoroughly mixed. The mixture is then allowed to age in the closed vessel at or near ambient conditions for a period of time sufficient to impregnate the resin particles with the blowing agent. Preferably the aging period comprises at least about 24 hours, more preferably at least about 3 days and most preferably at least about 5 days. Any vessel suitable for holding thermoplastic resin particles and liquid blowing agent may be employed. Further, any conventional mixer or method of mixing are suitable for the purposes of the present invention.

DESCRIPTION OF THE PREFERRED EMBODIMENTS

The following specific examples illustrate the present invention. However, they are not to be construed to limit the claims in any manner whatsoever.

EXAMPLES 1-5

20 g Noryl® 4705 granulate, consisting of roughly spherical particles having an average diameter of about 0.2 mm is placed in a container. To this is added 2 g n-pentane liquid blowing agent. The mixture is agitated for a short time to thoroughly mix the n-pentane and Noryl® 4705 granulate. At this point the granulate is wet but does not flow. The container is closed and the mixture is allowed to age at room temperature. At various intervals, a small portion of the resin is placed in an oven at 110° C. for 3 minutes. The results and observations are set forth in Table I below.

TABLE I

| EXAMPLE | AGING TIME (DAYS) | BULK DENSITY OF EXPANDED POWDER (lbs/ft$^3$) | OBSERVATIONS |
| --- | --- | --- | --- |
| 1* | 0 | — | wet, non-flowing granulate |
| 1 | 1 | 9.7 | Almost dry granulate. Hard center in some expanded beads. |
| 2 | 2 | 6.1 | Dry free flowing granulate. Particles foamed, although the beads thus formed were irregularly shaped. Bead size was approximately 2 mm in diameter. |
| 3 | 3 | 5.3 | Spherical foamed beads approximately 2 mm in diameter. |
| 4 | 5 | 4.9 | Spherical foamed beads approximately 2 mm in diameter. |
| 5 | 7 | 4.9 | Spherical foamed beads |

TABLE I-continued

| EXAMPLE | AGING TIME (DAYS) | BULK DENSITY OF EXPANDED POWDER (lbs/ft³) | OBSERVATIONS |
| --- | --- | --- | --- |
| | | | approximately 2 mm in diameter. |

*Comparative Example

Thus it is seen that in five days n-pentane is into the Noryl ® particles.

The above-mentioned patents, patent applications and publications are incorporated herein by reference.

Many variations of the present invention will suggest themselves to those skilled in the art in light of the above detailed description. For example, instead of Noryl ® any polyphenylene ether resin may be employed, such as a poly(2,6-dimethyl-co-2,3,6-trimethyl-1,4-phenylene) ether. Further, it is contemplated that a wide range of thermoplastic resins may be used, e.g. principally atactic polystyrene, poly(alpha-methylstyrene), poly(nuclear-methylstyrene), poly(para-methylstyrene), poly(para-tert-butylstyrene), poly(bromostyrene), poly(dibromostyrene), poly(chlorostyrene), poly(dichlorostyrene), styrene-maleic anhydride copolymer, styreneacrylonitrile copolymer, styrene-acrylonitrile-butadiene terpolymer, styrene-divinylbenzene copolymer, polycarbonates, polyesters, polyetherimides, poly(etherimide esters), polyolefins, polyamides, polysulfones, polyethersulfones and mixtures of any of the foregoing. Also useful in the present invention are a wide variety of blowing agents other than n-pentane. For instance it is within the scope of the present invention to employ any blowing agent, for instance, butane, isopentane, neopentane, cyclopentane, pentene, hexane, methylene chloride, chloroform, carbon tetrachloride, $CCl_3F$, $CCl_2F_2$, $CHClF_2$, $CClF_2$-$CClF_2$, $C_1$-$C_5$ alcohols, halogenated alcohols such as fluoroisopropanol, acetone, ethyl acetate, methylethyl ketone, mixtures thereof and the like. Also contemplated are HCFC-123, HCFC-123A, HCFC-124, HFC-134A, HCFC-141B, HCFC-142B and HFC-152A. All such obvious modifications are within the full intended scope of the appended claims.

We claim:

1. A process for producing expandable thermoplastic resin particles comprising:
    (a) adding said thermoplastic resin in particulate form to a vessel;
    (b) adding a desired amount of a blowing agent;
    (c) agitating the mixture until the blowing agent and the resin particles are thoroughly mixed; and
    (d) closing the vessel and allowing said mixture to age for a period of time sufficient to impregnate said particles with said blowing agent; wherein said process steps (a), (b), (c) and (d) are all carried out at or near ambient conditions.

2. A process as defined in claim 1 wherein said thermoplastic resin comprises a polyphenylene ether.

3. A process as defined in claim 1 wherein said thermoplastic resin comprises an alkenyl aromatic polymer or copolymer.

4. A process as defined in claim 3 wherein said alkenyl aromatic polymer of copolymer is selected from the group consisting of principally atactic polystyrene, poly(alphamethylstyrene), poly(nuclear-methylstyrene), poly(paramethylstyrene), poly(para-tert-butylstyrene), polybromostyrene, polydibromostyrene, poly(chlorostyrene), poly(dichlorostyrene), a styrene-maleic anhydride copolymer and mixtures of any of the foregoing.

5. A process as defined in claim 4 wherein said alkenyl aromatic polymer or copolymer comprises a styrene-maleic anhydride copolymer.

6. A process as defined in claim 1 wherein said thermoplastic resin comprises a polyphenylene ether/polystyrene blend.

7. A process as defined in claim 2 wherein said polyphenylene ether comprises poly(2,6-dimethyl-1, 4-phenylene)ether, poly(2,3,6-trimethyl-1,4-phenylene ether, poly(2,6-dimethyl-co-2,3,6-trimethyl-1,4-phenylene) ether or a mixture thereof.

8. A process as defined in claim 6 wherein said polyphenylene ether/polystyrene blend comprises from about 1 to about 99 parts by weight of polyphenylene ether and from about 99 to about 1 part by weight of polystyrene based on 100 parts by weight of the polyphenylene ether and polystyrene combined.

9. A process as defined in claim 8 wherein said polyphenylene ether/polystyrene blend comprises from about 20 to about 80 parts by weight of polyphenylene ether and from about 80 to about 20 parts by weight of polystyrene based on 100 parts by weight of polyphenylene etner and polystyrene combined.

10. A process as defined in claim 1 wherein said blowing agent comprises a straight-chain, branched, cyclic, halogen-substituted hydrocarbon or mixture thereof.

11. A process as defined in claim 10 wherein said blowing agent is selected from the group consisting of butane, n-pentane, isopentane, neopentane, pentene, cyclopentane, hexane, heptane, octane, methylene chloride, chloroform, carbon tetrachloride, trichlorofluoromethane, dichlorodifluoromethane, chlorodifluoromethane, dichlorotetrafluoroethane, HCFC's, acetone, ethyl acetate, methylethyl ketone and a mixture of any of the foregoing.

12. A process as defined in claim 10 wherein said blowing agent comprises n-pentane, isopentane, cyclopentane, neopentane or mixtures thereof.

13. A process as defined in claim 11 wherein said HCFC's are selected from the group consisting of HCFC-22, HCFC-123, HCFC-123A, HCFC-124, HFC-134A, HCFC-141B, HCFC-142B, HFC-152A and mixtures of any of the foregoing.

14. A process as defined in claim 10 wherein said blowing agent comprises n-pentane in combination with ethyl acetate or methylethyl ketone, or mixtures thereof.

15. A process as defined in claim 1 wherein said desired amount of a blowing agent comprises from about 2 to about 20 weight percent based on the weight of the thermoplastic resin.

16. A process as defined in claim 15 wherein said desired amount of a blowing agent comprises from about 5 to about 15 weight percent based on the weight of the thermoplastic resin.

17. A process as defined in claim 16 wherein said desired amount of a blowing agent comprises from about 6 to about 8 weight percent based on the weight of the thermoplastic resin.

18. A process as defined in claim 1 wherein said thermoplastic resin particles comprise granules consisting of cylindrical or substantially spherical particles of up to about 2.0 mm in diameter.

19. A process as defined in claim 18 wherein said thermoplastic resin particles comprise granules consisting of cylindrical or substantially spherical particles of up to about 1.0 mm average diameter.

20. A process as defined in claim 19 wherein said thermoplastic resin particles comprise granules consisting of cylindrical or substantially spherical particles of up to about 0.5 mm in diameter.

21. A process as defined in claim 1 wherein said mixture ages at room temperature for at least about 5 days.

22. A process as defined in claim 21 wherein said mixture ages at room temperature for at least about 3 days.

23. A process as defined in claim 22 wherein said mixture ages at room temperature for at least about 24 hours.

24. A process as defined in claim 1 further comprising adding to the thermoplastic resin particles effective amounts of additives selected from the group consisting of impact modifiers, flame retardants, pigments, processing aids, plasticizers, antistatic agents, lubricants and mixtures of any of the foregoing.

* * * * *